US010785656B2

(12) United States Patent
Ang et al.

(10) Patent No.: US 10,785,656 B2
(45) Date of Patent: Sep. 22, 2020

(54) BANDWIDTH PART SWITCH MANAGEMENT

(71) Applicant: QUALCOMM Incorporated, San Diego, CA (US)

(72) Inventors: Peter Pui Lok Ang, San Diego, CA (US); Wanshi Chen, San Diego, CA (US); Prashanth Haridas Hande, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 16/239,102

(22) Filed: Jan. 3, 2019

(65) Prior Publication Data

US 2019/0230513 A1    Jul. 25, 2019

Related U.S. Application Data

(60) Provisional application No. 62/619,978, filed on Jan. 22, 2018.

(51) Int. Cl.
*H04W 16/10* (2009.01)
*H04W 16/14* (2009.01)
(Continued)

(52) U.S. Cl.
CPC .......... *H04W 16/10* (2013.01); *H04L 5/0064* (2013.01); *H04L 5/0096* (2013.01); *H04L 5/14* (2013.01);
(Continued)

(58) Field of Classification Search
None
See application file for complete search history.

(56) References Cited

U.S. PATENT DOCUMENTS

2011/0310896 A1\* 12/2011 Cheng .................... H04L 47/10
370/390
2013/0155953 A1\* 6/2013 Chu ...................... H04W 28/20
370/328
(Continued)

OTHER PUBLICATIONS

Partial International Search Report—PCT/US2019/012262—ISA/EPO—dated Apr. 24, 2019.
(Continued)

*Primary Examiner* — Bunjob Jaroenchonwanit
(74) *Attorney, Agent, or Firm* — Harrity & Harrity, LLP/Qualcomm

(57) ABSTRACT

Various aspects of the present disclosure generally relate to wireless communication. In some aspects, a base station (BS) may transmit and a user equipment (UE) may receive cloned bandwidth part configuration information. In some aspects, the UE may determine a linkage between a primary bandwidth part and the cloned bandwidth part. In some aspects, the BS may transmit and the UE may receive a downlink control information message identifying the primary bandwidth part to signal a bandwidth part switch for the primary bandwidth part and a first bandwidth part or identifying the cloned bandwidth part to signal the bandwidth part switch for the primary bandwidth part and a second bandwidth part. In some aspects, the UE may perform the bandwidth part switch based at least in part on the downlink control information message. Numerous other aspects are provided.

38 Claims, 12 Drawing Sheets

(51) Int. Cl.
  *H04L 5/00* (2006.01)
  *H04L 5/14* (2006.01)
  *H04W 72/04* (2009.01)
  *H04W 84/04* (2009.01)

(52) U.S. Cl.
  CPC ....... *H04W 16/14* (2013.01); *H04W 72/0453* (2013.01); *H04L 5/001* (2013.01); *H04L 5/0032* (2013.01); *H04W 84/045* (2013.01)

(56) References Cited

U.S. PATENT DOCUMENTS

| | | | |
|---|---|---|---|
| 2014/0135055 A1* | 5/2014 | Fu | H04W 52/325 |
| | | | 455/522 |
| 2017/0064718 A1* | 3/2017 | Bharadwaj | H04W 28/08 |
| 2018/0183551 A1* | 6/2018 | Chou | H04L 5/001 |
| 2018/0199343 A1* | 7/2018 | Deogun | H04L 5/0044 |
| 2019/0090299 A1* | 3/2019 | Ang | H04L 5/0053 |
| 2019/0103953 A1* | 4/2019 | Liao | H04L 5/0042 |
| 2019/0132793 A1* | 5/2019 | Lin | H04W 52/0206 |
| 2019/0140881 A1* | 5/2019 | Akkarakaran | H04L 27/2657 |
| 2019/0149380 A1* | 5/2019 | Babaei | H04W 72/044 |
| | | | 370/330 |
| 2019/0158229 A1* | 5/2019 | Wei | H04W 76/28 |
| 2019/0166066 A1* | 5/2019 | Ang | H04L 5/1469 |
| 2019/0166529 A1* | 5/2019 | Chen | H04W 74/006 |
| 2019/0166555 A1* | 5/2019 | Cheng | H04W 72/14 |
| 2019/0182000 A1* | 6/2019 | Futaki | H04W 72/0453 |
| 2019/0191399 A1* | 6/2019 | Islam | H04W 56/005 |
| 2019/0199592 A1* | 6/2019 | Lin | H04L 5/0098 |
| 2019/0208548 A1* | 7/2019 | Shih | H04L 5/0051 |
| 2019/0215847 A1* | 7/2019 | Abdoli | H04W 36/06 |
| 2019/0215861 A1* | 7/2019 | Son | H04W 56/004 |
| 2019/0215871 A1* | 7/2019 | Aiba | H04W 74/0833 |
| 2019/0215888 A1* | 7/2019 | Cirik | H04B 7/0695 |
| 2019/0215896 A1* | 7/2019 | Zhou | H04B 7/0626 |
| 2019/0222404 A1* | 7/2019 | Ang | H04L 5/0098 |
| 2019/0258407 A1* | 8/2019 | Buzzard | G06F 3/067 |
| 2019/0268910 A1* | 8/2019 | Chen | H04L 5/0064 |
| 2019/0349963 A1* | 11/2019 | Abdoli | H04W 72/0453 |
| 2019/0364602 A1* | 11/2019 | Yi | H04W 74/0833 |
| 2020/0037260 A1* | 1/2020 | Fu | H04W 52/325 |
| 2020/0059345 A1* | 2/2020 | Pelletier | H04L 1/1657 |
| 2020/0059390 A1* | 2/2020 | Zhang | H04W 72/14 |
| 2020/0119895 A1* | 4/2020 | Choi | H04L 5/00 |
| 2020/0125583 A1* | 4/2020 | Chen | G06F 11/2074 |
| 2020/0145936 A1* | 5/2020 | Lee | H04W 52/365 |

OTHER PUBLICATIONS

Samsung: "Activation/deactivation of Bandwidth Parts in NR," 3GPP Draft; R2-1711189, Activation_Deactivation of Bandwidth Part in NR_R2, 3rd Generation Partnership Project (3GPP), Mobile Competence Centre; 650, Route Des Lucioles; F-06921, Sophia-Antipolis Cede, vol. RAN WG2, No. Prague, Czech; Oct. 9, 2017-Oct. 13, 2017, Sep. 29, 2017, XP051355440, 5 pages, Retrieved from the Internet: URL: http://www.3gpp.org/ftp/tsg_ran/WG2_RL2/TSGR2_99bis/Docs/ [retrieved on Sep. 29, 2017].

Vivo: "Remaining Details for Bandwidth Part Operation," 3GPP Draft; R1-1715648_BWP, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339114, 3 pages, Retrieved from the Internet: URL: http://www.3gpp.org/ftp/Meetings_3GPP_SYNC/RAN1/Docs/ [retrieved on Sep. 17, 2017] figure 2, sections 1, 2, 2.1-2.3.

Vivo: "Remaining Details for Bandwidth Part Operation," 3GPP Draft; R1-1717504_Remaining Details for Bandwith Part Operation, 3rd Generation Partnership Project (3GPP), Mobile Competence Centre; 650, Route Des Lucioles; F-06921 Sophia-Antipolis Cedex; vol. RAN WG1, No. Prague, CZ; Oct. 9, 2017-Oct. 13, 2017, Oct. 8, 2017, XP051340692, 4 pages, Retrieved from the Internet: URL: http://www.3gpp.org/ftp/Meetings_3GPP_SYNC/RAN1/Docs/ [retrieved on Oct. 8, 2017] figure 2, sections 1, 2.1-2.4.

International Search Report and Written Opinion—PCT/US2019/012262—ISA/EPO—dated Jun. 28, 2019.

Qualcomm Incorporated: "Further Considerations For Bandwidth Parts," 3GPP Draft; R1-1713457_Further_Considerations_For_Bandwidth_Parts, 3rd Generation Partnership Project (3GPP). Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316259, 5 pages, Retrieved from the Internet: URL: http://www.3gpp.org/ftp/Meetings_3GPP_SYNC/RAN1/Docs/ [retrieved on Aug. 20, 2017] sections 1-3.

* cited by examiner

US 10,785,656 B2

BANDWIDTH PART SWITCH MANAGEMENT

CROSS-REFERENCE TO RELATED APPLICATIONS UNDER 35 U.S.C. § 119

This application claims priority to US Provisional Patent Application No. 62/619,978, filed on Jan. 22, 2018, entitled "TECHNIQUES AND APPARATUSES FOR BANDWIDTH PART SWITCH MANAGEMENT," which is hereby expressly incorporated by reference herein.

FIELD OF THE DISCLOSURE

Aspects of the present disclosure generally relate to wireless communication, and more particularly to techniques and apparatuses for bandwidth part switch management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include transmitting cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The method may include transmitting a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part.

In some aspects, a base station for wireless communication may include memory and one or more processors operatively coupled to the memory. The memory and the one or more processors may be configured to transmit cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The memory and the one or more processors may be configured to transmit a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part.

In some aspects, a non-transitory computer-readable medium may store one or more instructions for wireless communication. The one or more instructions, when executed by one or more processors of a base station, may cause the one or more processors to transmit cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The one or more instructions, when executed by the one or more processors of the base station, may cause the one or more processors to transmit a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part.

In some aspects, an apparatus for wireless communication may include means for transmitting cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The apparatus may include means for transmitting a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part.

In some aspects, a method of wireless communication may include receiving cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The method may include determining a linkage between the primary bandwidth part and the cloned bandwidth part based at least in part on the cloned bandwidth part configuration information. The method may include receiving a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part. The method may include performing the bandwidth part switch based at least in part on the downlink control information message.

In some aspects, a user equipment for wireless communication may include memory and one or more processors operatively coupled to the memory. The memory and the one or more processors may be configured to receive cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The memory and the one or more processors may be configured to determine a linkage between the primary bandwidth part and the cloned bandwidth part based at least in part on the cloned bandwidth part configuration information. The memory and the one or more processors may be configured to receive a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part. The memory and the one or more processors may be configured to perform the bandwidth part switch based at least in part on the downlink control information message.

In some aspects, a non-transitory computer-readable medium may store one or more instructions for wireless communication. The one or more instructions, when executed by one or more processors of a user equipment, may cause the one or more processors to receive cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The one or more instructions, when executed by the one or more processors of the user equipment, may cause the one or more processors to determine a linkage between the primary bandwidth part and the cloned bandwidth part based at least in part on the cloned bandwidth part configuration information. The one or more instructions, when executed by the one or more processors of the user equipment, may cause the one or more processors to receive a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part. The one or more instructions, when executed by the one or more processors of the user equipment, may cause the one or more processors to perform the bandwidth part switch based at least in part on the downlink control information message.

In some aspects, an apparatus for wireless communication may include means for receiving cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction. The apparatus may include means for determining a linkage between the primary bandwidth part and the cloned bandwidth part based at least in part on the cloned bandwidth part configuration information. The apparatus may include means for receiving a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part. The apparatus may include means for performing the bandwidth part switch based at least in part on the downlink control information message.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
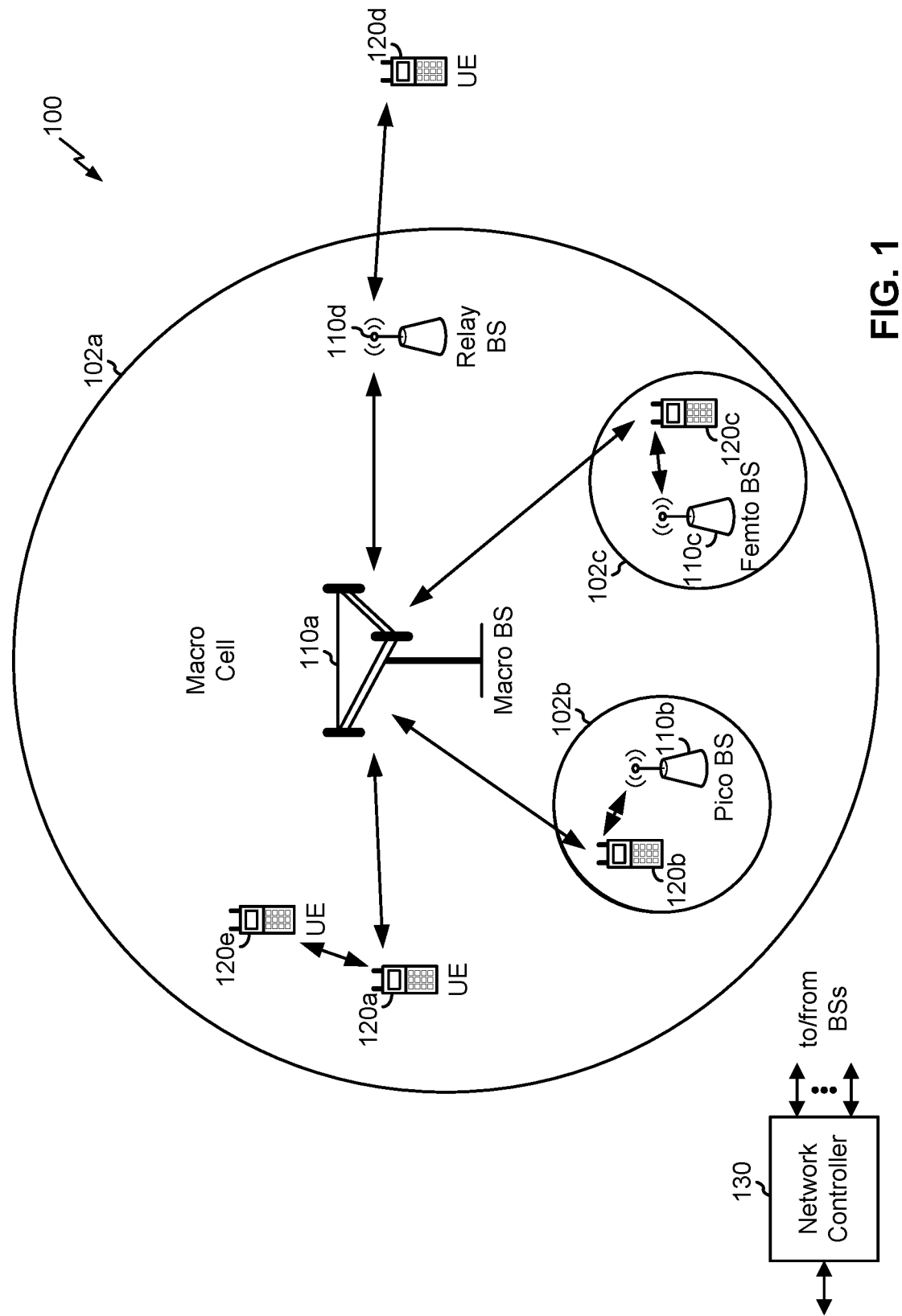
- FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
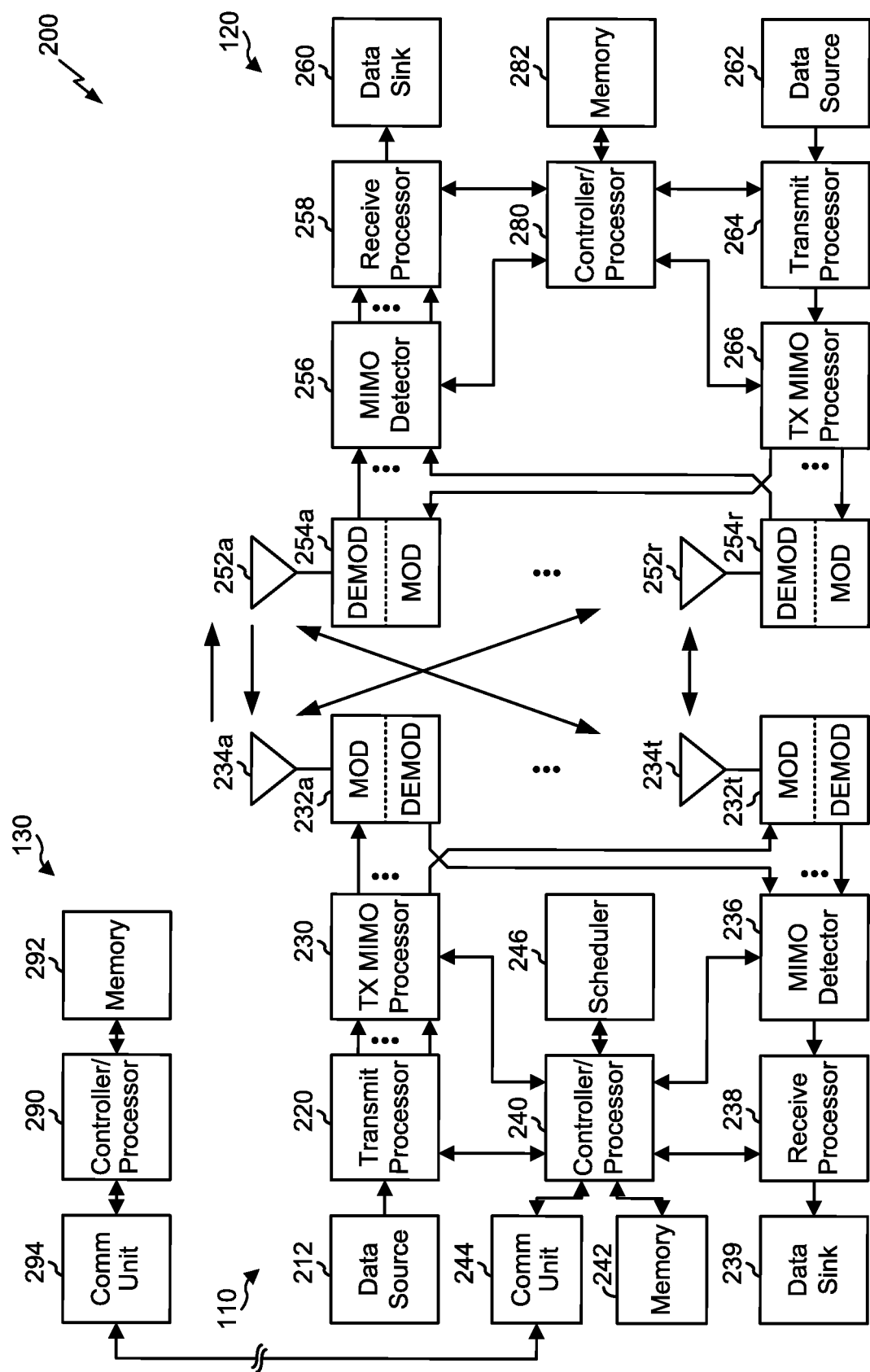
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with bandwidth part switch management, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction; means for determining a linkage between the primary bandwidth part and the cloned bandwidth part based at least in part on the cloned bandwidth part configuration information; means for receiving a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part; means for performing the bandwidth part switch based at least in part on the downlink control information message; and/or the like. In some aspects, such means may include one or more components of UE 120 described in connection with FIG. 2.

In some aspects, base station 110 may include means for transmitting cloned bandwidth part configuration information for a cloned bandwidth part of a primary bandwidth part, wherein the cloned bandwidth part is associated with a first direction and corresponds to the primary bandwidth part, and wherein the primary bandwidth part pairs to a first bandwidth part in a second direction and a second bandwidth part in the second direction; means for transmitting a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
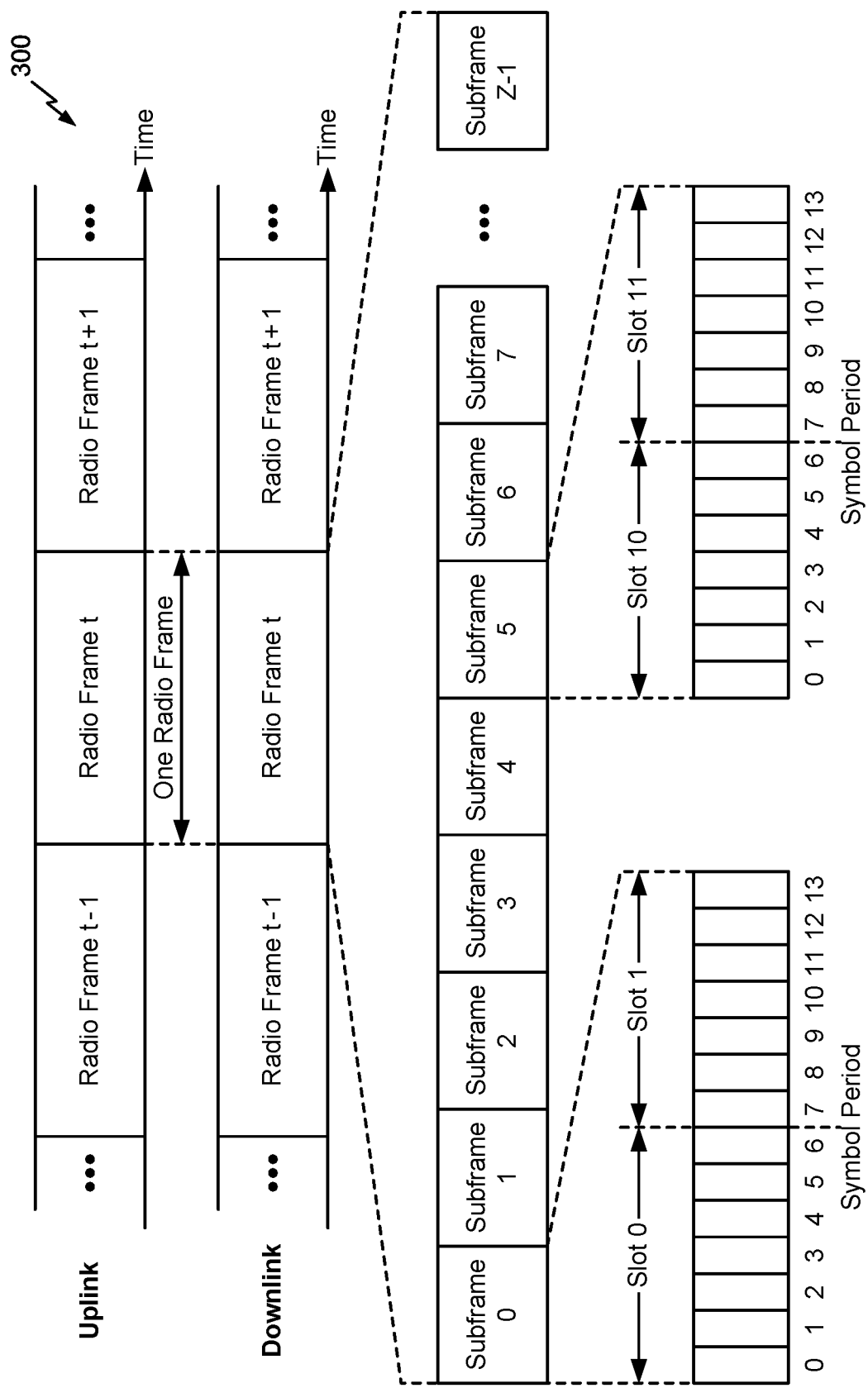
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
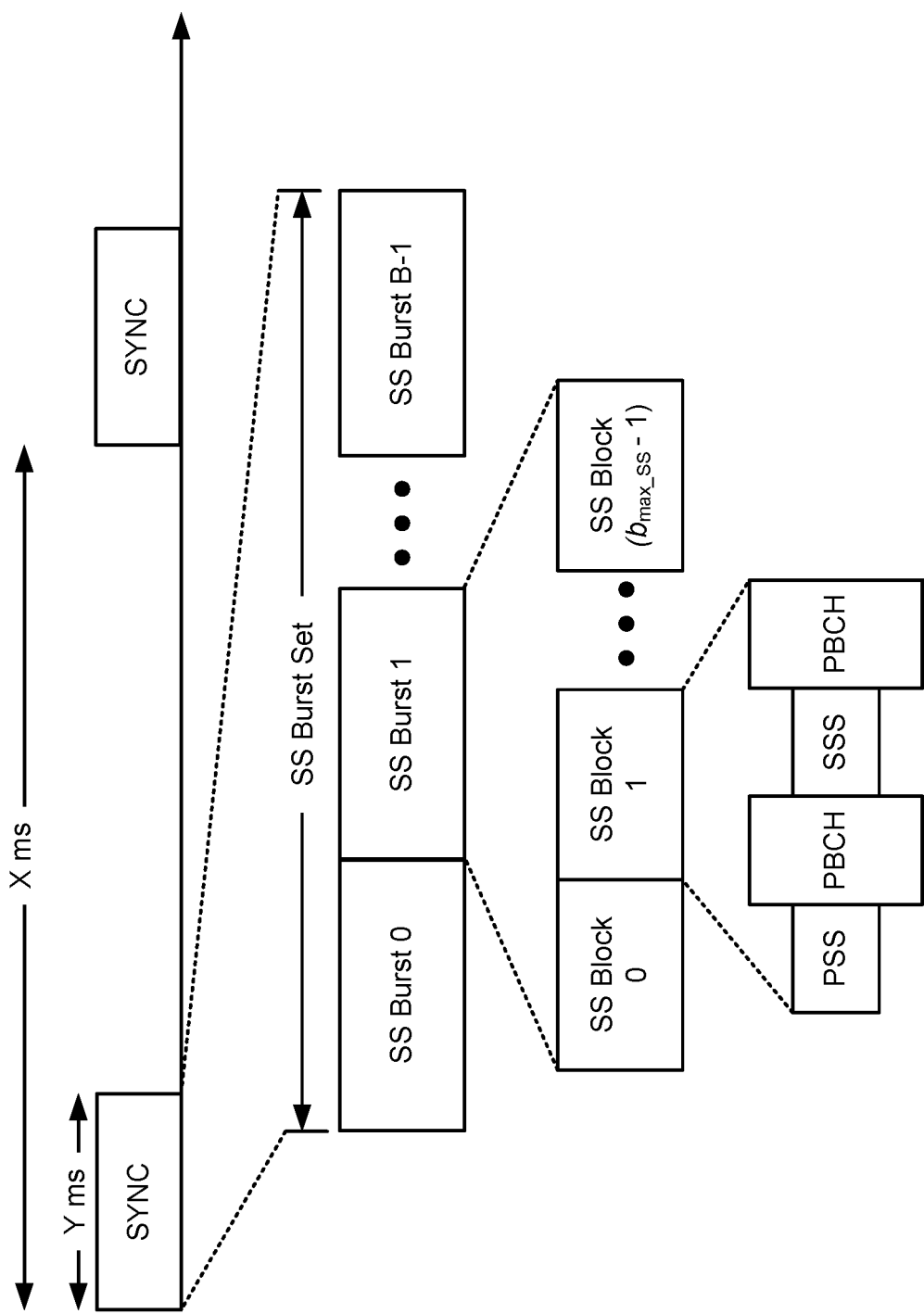
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
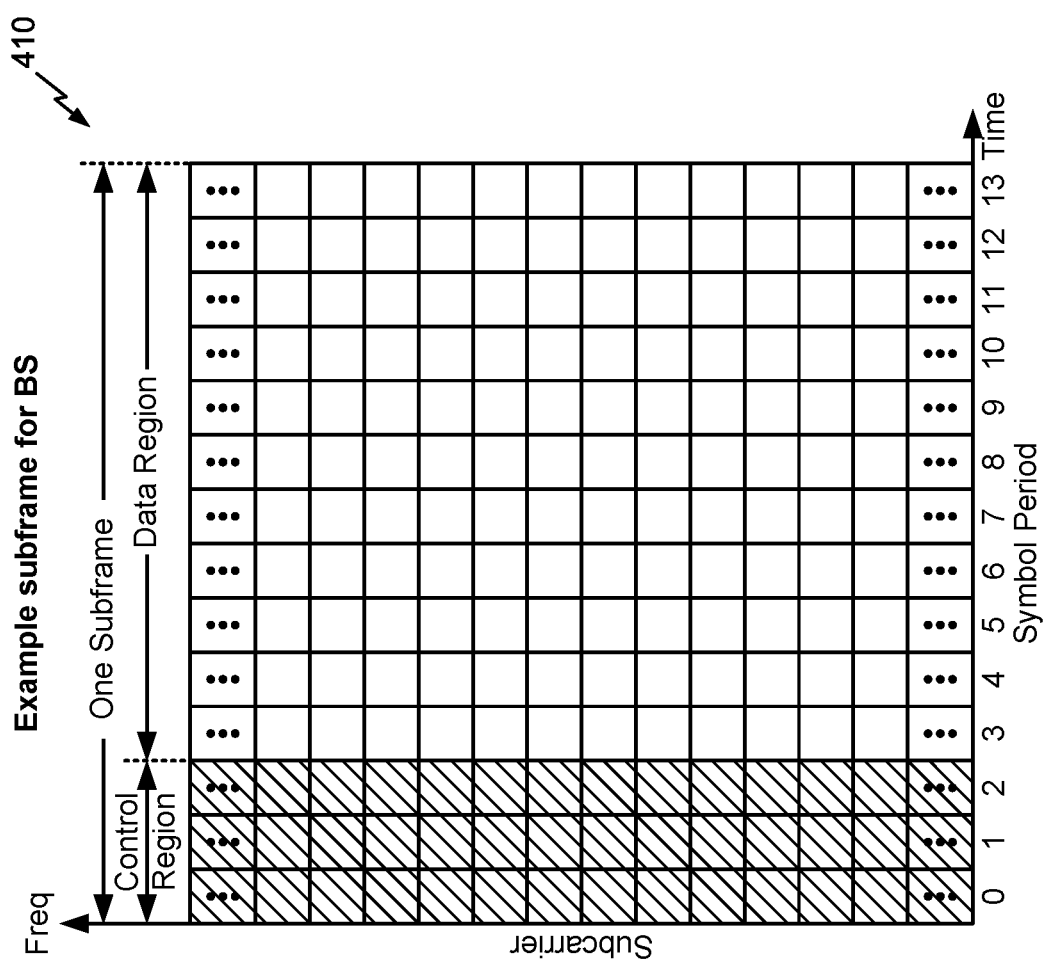
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
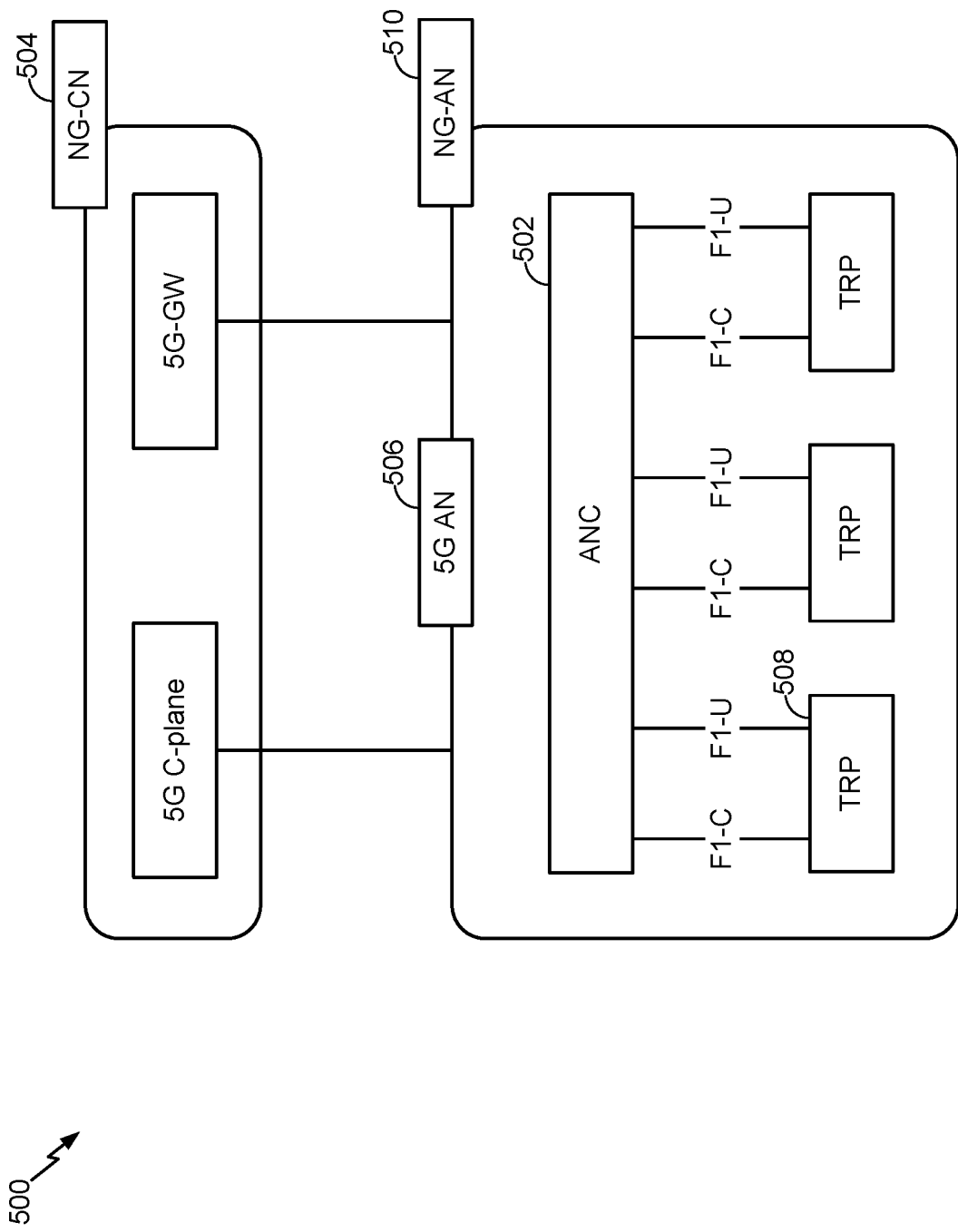
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
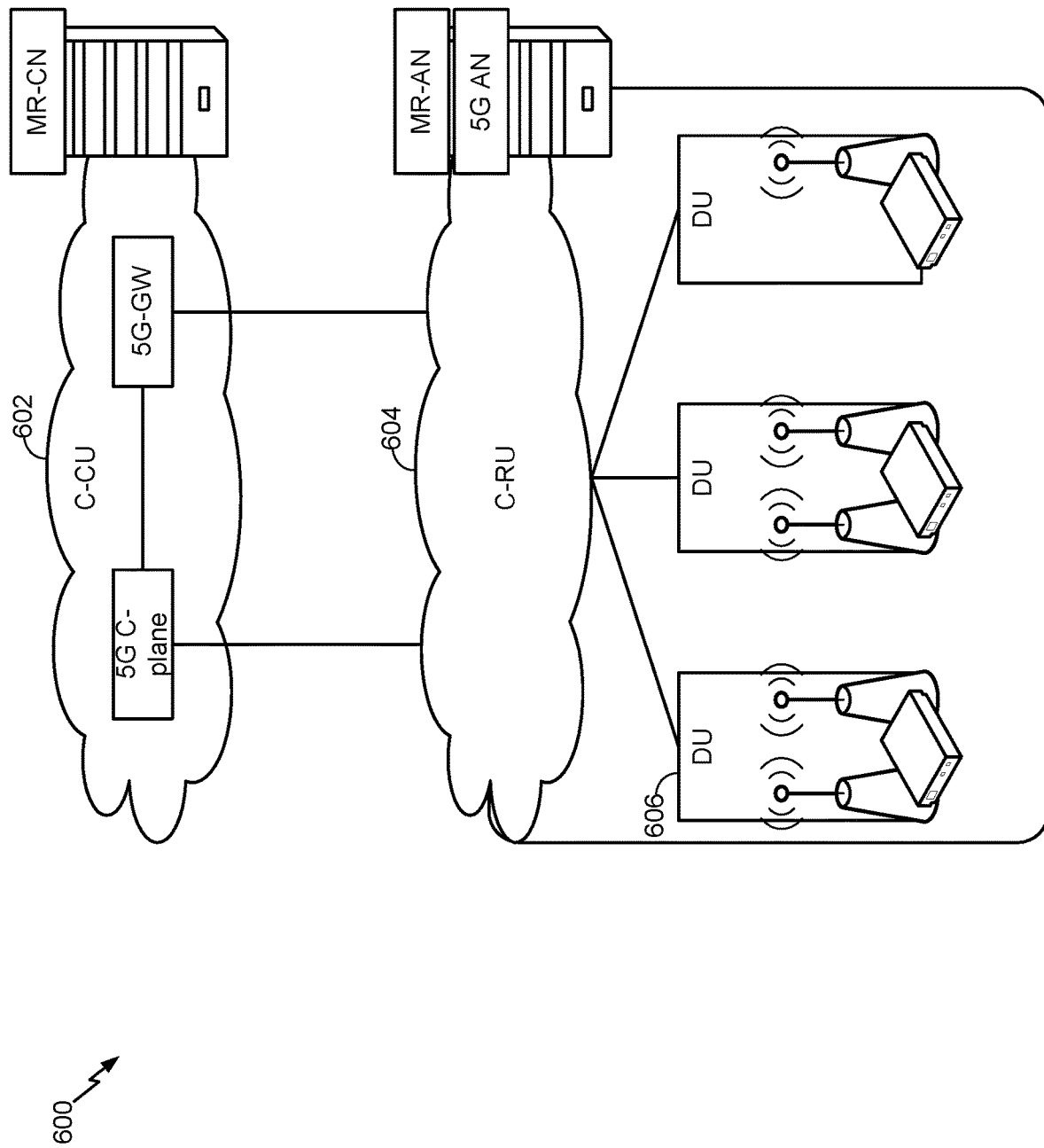
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In certain communications systems, such as 5G, NR, and/or the like, bandwidth parts may be configured for a UE. A UE may use a particular bandwidth part of a plurality of available bandwidth parts for communication with a BS. The UE may monitor a downlink control channel in a particular bandwidth part, such as a physical downlink control channel (PDDCH), in each subframe, slot, and/or the like to determine whether to receive downlink data from the BS. Each bandwidth part may be associated with a particular center frequency location, a particular bandwidth, a particular numerology, and/or the like. A BS may transmit a downlink control information (DCI) message to trigger a transition between bandwidth parts. For example, the BS may transmit the DCI message to provide a bandwidth part identifier identifying a bandwidth part, of a plurality of bandwidth parts, that is to be activated. If the bandwidth part, identified by the DCI message, is different from a currently active bandwidth part, the UE may be triggered to perform a bandwidth part switch.

The BS may provide a plurality of bandwidth part identifiers to identify a plurality of bandwidth parts that are to be activated. For example, the BS may provide a first bandwidth part identifier to identify a first bandwidth part that is to be activated for an uplink direction and a second bandwidth part identifier to identify a second bandwidth part that is to be activated for a downlink direction. However, providing the plurality of bandwidth part identifiers may result in excessive utilization of network resources.

As a result, the BS may provide a single bandwidth part identifier identifying a single bandwidth part to trigger a bandwidth part switch for the single bandwidth part and another bandwidth part paired with the single bandwidth part. In this case, the UE may identify the other bandwidth part paired with the single bandwidth part, and may trigger the bandwidth part switch. However, in some cases, a first bandwidth part associated with a first direction may be paired with a plurality of second bandwidth parts associated with a second direction, which may be termed one-to-plurality pairing (or plurality-to-one pairing with regard to a plurality of first bandwidth parts paired with a single second bandwidth part). Providing a single bandwidth part identifier may result in ambiguity as to which paired bandwidth part is to be activated in connection with an identified bandwidth part.

The communications system may prohibit one-to-plurality pairing or plurality-to-one pairing to avoid ambiguity in bandwidth part activation. However, prohibitions on pairing schemes may limit flexibility of the communications system. The communications system may enable a bandwidth part pairing table. In this case, a first bandwidth part and a second bandwidth part may be associated with a first index value and the first bandwidth part and a third bandwidth part may be associated with a second index value. As a result, the BS may provide an index value for the bandwidth part pairing table to identify a bandwidth part pair for activation. However, this may result in excessive utilization of network resources to identify bandwidth part pairing table indices and/or provide the bandwidth part pairing table to each UE.

Some aspects, described herein, enable bandwidth part switch management, such as for one-to-plurality or plurality-to-one pairings of bandwidth parts. For example, a BS may transmit, and a UE may receive, cloned bandwidth part configuration information to identify a one-to-plurality or plurality-to-one pairing for a primary bandwidth part. In this case, the UE may determine a linkage between a cloned bandwidth part, which may also be termed a pseudo-bandwidth part, and the primary bandwidth part, and may use signaling identifying the cloned bandwidth part or the primary bandwidth part to distinguish between a first bandwidth part paired to the primary bandwidth part and a second bandwidth part paired to the primary bandwidth part. In this way, the BS and the UE enable one-to-plurality pairing and/or plurality-to-one pairing, reduce a likelihood of ambiguity in bandwidth part switch signaling relative to other techniques, and/or reduce a utilization of network resources relative to other techniques.

Figure 7A:
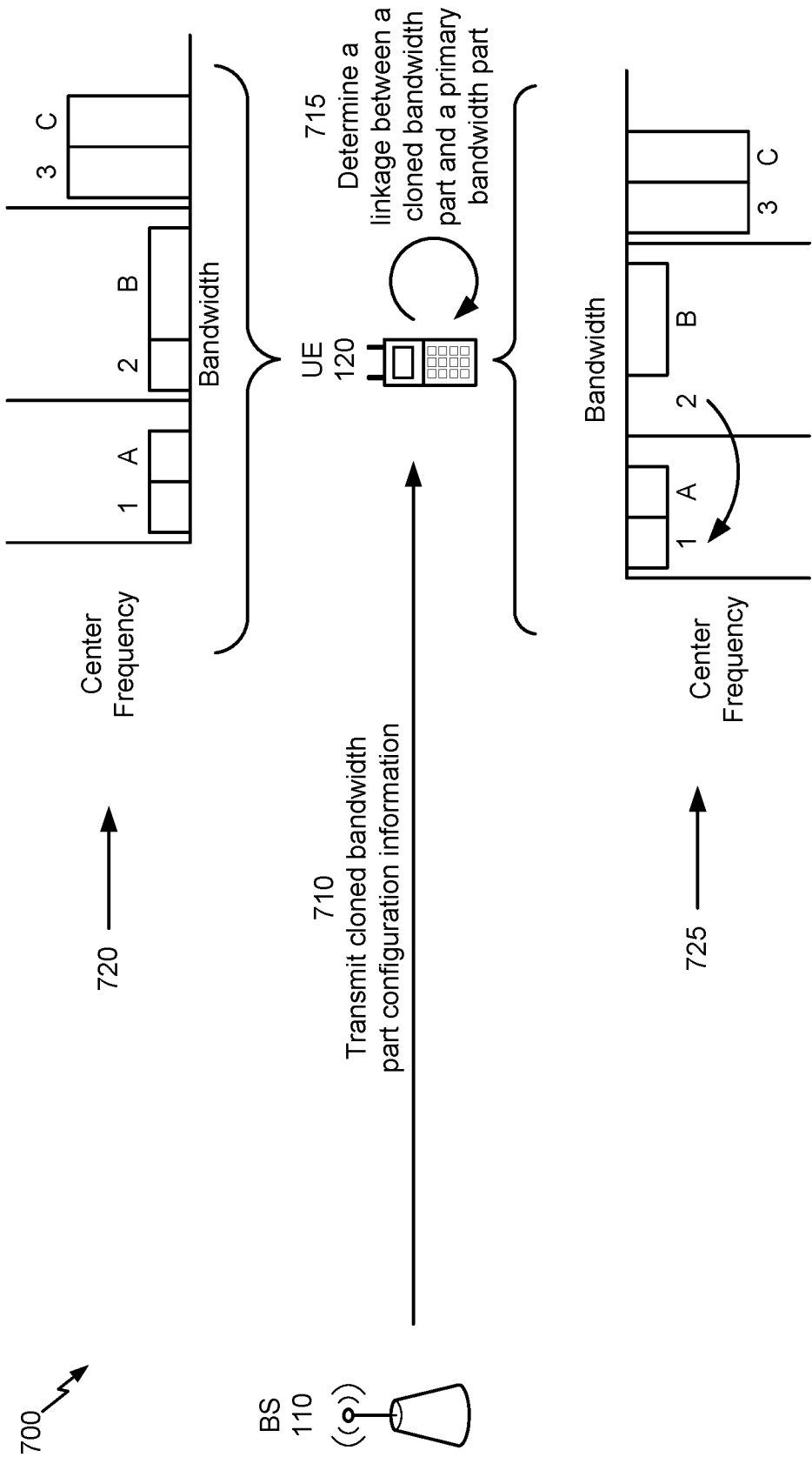
FIGS. 7A-7C are diagrams illustrating examples of bandwidth part switch management, in accordance with various aspects of the present disclosure.
Figure 7B:
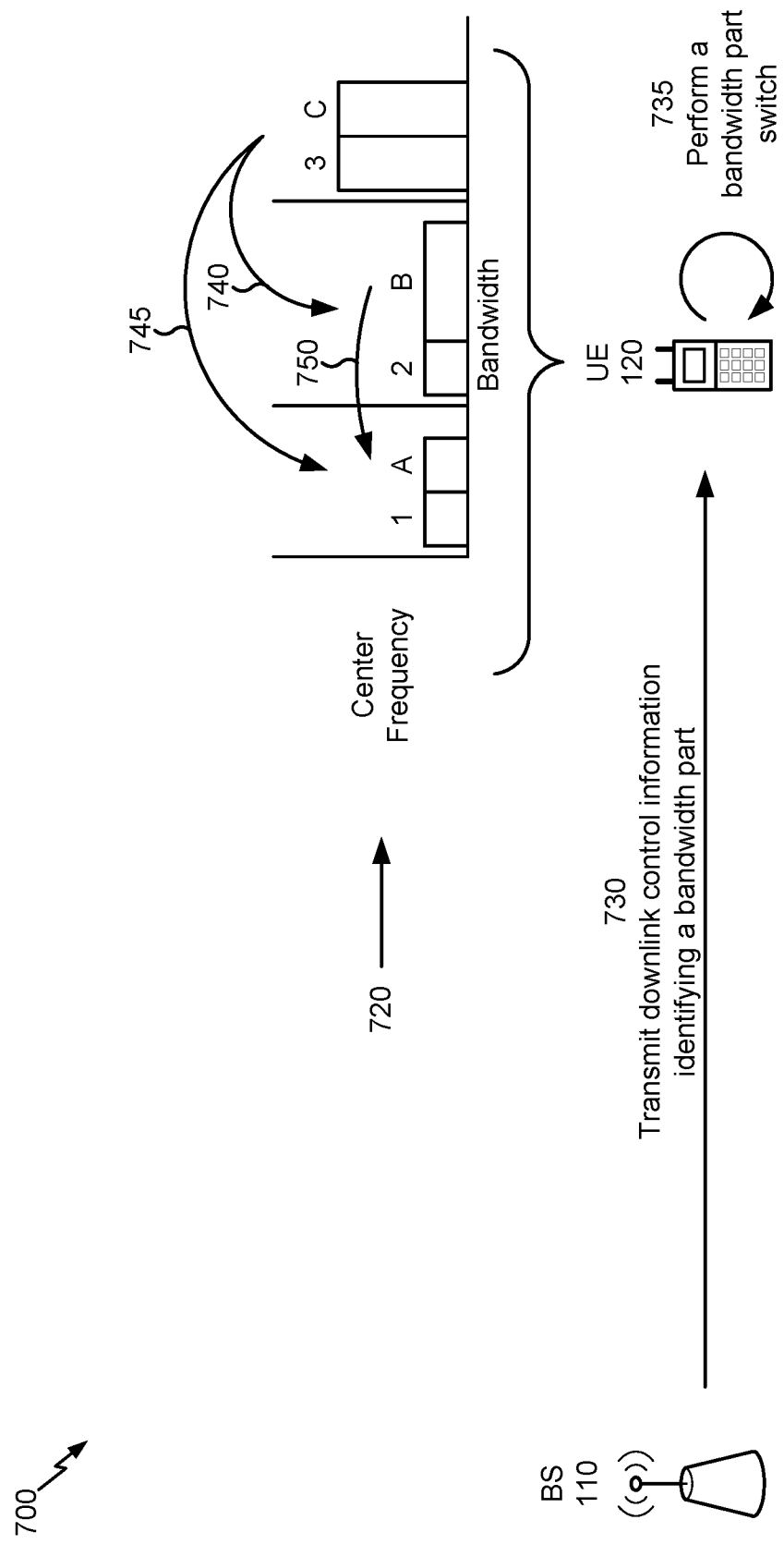
Figure 7C:
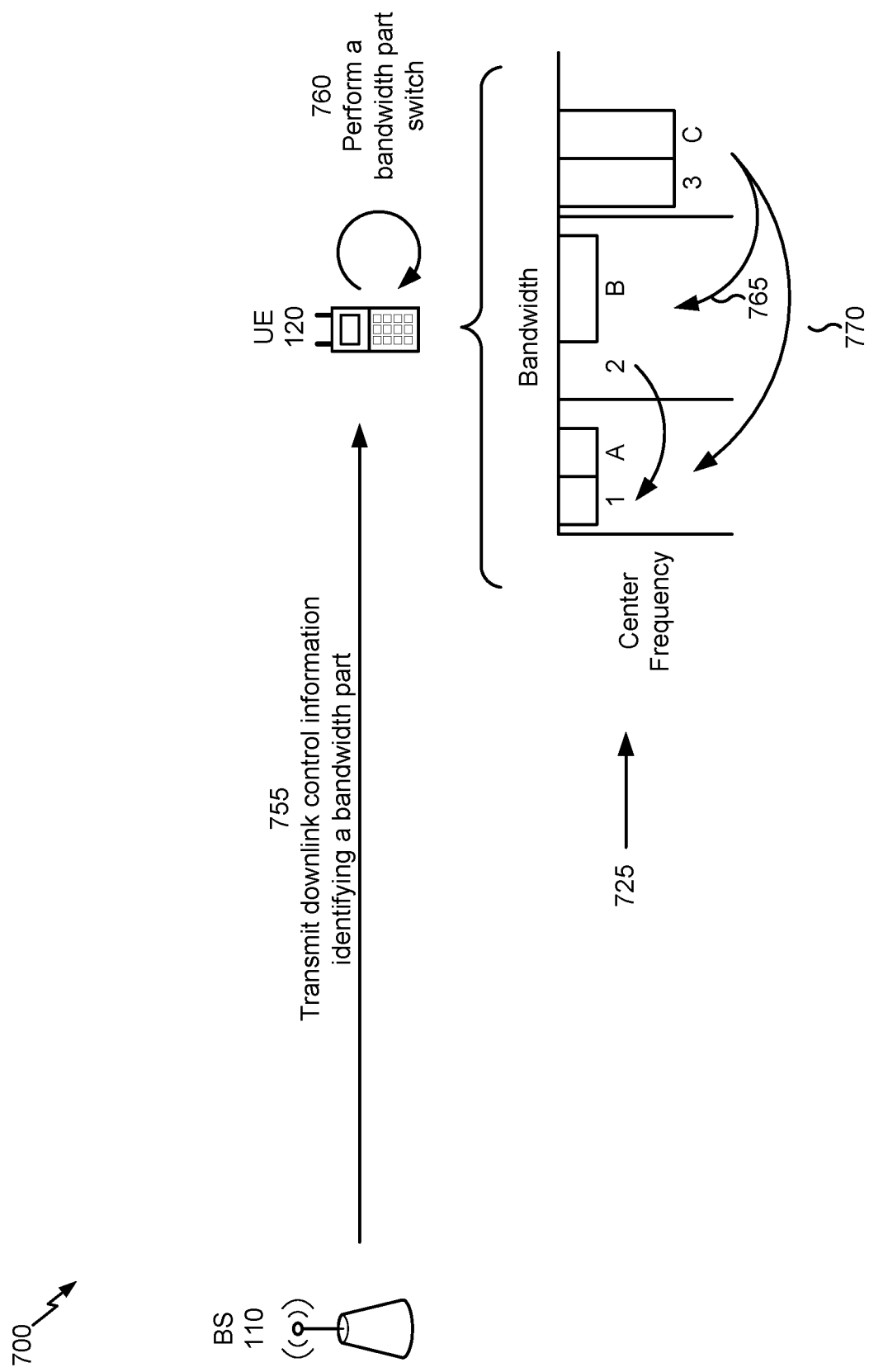

FIGS. 7A-7C are diagrams illustrating an example 700 of bandwidth part switch management, in accordance with various aspects of the present disclosure. As shown in FIG. 7A, example 700 includes a BS 110 and a UE 120. BS 110 and UE 120 may be associated with a primary bandwidth part 1 in the uplink direction that is paired to a bandwidth part A in the downlink direction and a bandwidth part B in the downlink direction (e.g., one-to-plurality pairing).

As further shown in FIG. 7A, and by reference number 710, BS 110 may transmit, and UE 120 may receive, cloned bandwidth part configuration information. For example, BS 110 may configure a cloned bandwidth part 2 as a duplicate of primary bandwidth part 1. As shown by reference number 715, UE 120 may determine a linkage between cloned bandwidth part 2 and primary bandwidth part 1 based at least in part on the cloned bandwidth part configuration information.

For example, in a first scenario 720, the cloned bandwidth part configuration information may identify a configuration for cloned bandwidth part 2. In this case, BS 110 may configure cloned bandwidth part 2 associated with a common configuration with primary bandwidth part 1. For example, primary bandwidth part 1 and cloned bandwidth part 2 may be associated with a common center frequency, a common bandwidth, a common sub-carrier spacing, a common cyclic prefix length, a commonality in another configuration parameter, and/or the like. In this case, UE 120 may compare configuration information associated with primary bandwidth part 1, cloned bandwidth part 2, bandwidth part A, bandwidth part B, and/or the like, and may determine that primary bandwidth part 1 and cloned bandwidth part 2 are associated with common configurations. UE 120 may pair bandwidth part 1 with primary bandwidth part A, and may pair cloned bandwidth part 2 with bandwidth part B. In this way, UE 120 converts the one-to-plurality pairing to a one-to-one pairing using the duplicated primary bandwidth part 1 and cloned bandwidth part 2.

Additionally, or alternatively, in a second scenario 725, the cloned bandwidth part configuration information may identify a pointer to primary bandwidth part 1. In this case, BS 110 may provide information identifying cloned bandwidth part 2 and indicating that cloned bandwidth part 2 is to be a pointer to primary bandwidth part 1, rather than configuring bandwidth part 2 as an independent, but duplicate bandwidth part of bandwidth part 1. In other words, the pointer may indicate that a DCI message identifying cloned bandwidth part 2 in the uplink or bandwidth part B in the downlink is to indicate bandwidth part B in the downlink and primary bandwidth part 1 in the uplink. In this way, BS 110 reduces an amount of network resources used to provide the cloned bandwidth part configuration information to UE 120 relative to the first scenario.

In some aspects, BS 110 may provide information to configure cloned bandwidth part 2 as a duplicate bandwidth part of bandwidth part 1, and UE 120 may determine to store a pointer to bandwidth part 1 rather than configuring the duplicate bandwidth part. For example, UE 120 may determine, based at least in part on the configuration information for cloned bandwidth part 2, that cloned bandwidth part 2 is a duplicate of bandwidth part 1. In this case, UE 120 may determine to store a pointer for an identifier of cloned bandwidth part 2 to primary bandwidth part 1, thereby reducing a utilization of memory resources relative to storing configuration information (e.g., bandwidth information, center frequency information, and/or the like) for cloned bandwidth part 2.

As shown in FIG. 7B, and by reference numbers 730 and 735, in the first scenario 720, BS 110 may transmit a DCI message identifying a bandwidth part and UE 120 may determine to perform a bandwidth part switch (e.g., of an uplink bandwidth part, a downlink bandwidth part, a combination of an uplink bandwidth part and a downlink bandwidth part, and/or the like). For example, BS 110 may determine to activate primary bandwidth part 1 and bandwidth part B, and may transmit a DCI message identifying cloned bandwidth part 2 (or bandwidth part B). As shown by reference number 740, a bandwidth part 3 in the uplink direction is activated and a bandwidth part C in the downlink direction is activated, and the DCI message identifies cloned bandwidth part 2 (or bandwidth part B). In this case, the DCI message is to cause a switch from bandwidth part 3 to cloned bandwidth part 2 and from bandwidth part C to bandwidth part B. Based at least in part on receiving the DCI message, UE 120 activates cloned bandwidth part 2 and bandwidth part B. In this way, based at least in part on cloned bandwidth part 2 corresponding to bandwidth part 1 (e.g., being associated with a common bandwidth, center frequency, numerology, and/or the like), UE 120 correctly activates the configured pairing of primary bandwidth part 1 and bandwidth part B.

As another example, BS 110 may determine to activate primary bandwidth part 1 and bandwidth part A, and may transmit a DCI message identifying primary bandwidth part 1 (or bandwidth part A). As shown by reference number 745, when bandwidth part 3 is activated and bandwidth part C is activated, and the DCI message identifies primary bandwidth part 1 (or bandwidth part A), UE 120 activates bandwidth part 1 and bandwidth part A. In this way, based at least in part on primary bandwidth part 1 being paired only to bandwidth part A with regard to signaling (e.g., rather than being one-to-plurality paired to both bandwidth part A and bandwidth part B), UE 120 correctly activates the configured pairing of primary bandwidth part 1 and bandwidth part A.

As another example, BS 110 may determine to activate primary bandwidth part 1 and bandwidth part A, and may transmit a DCI message identifying bandwidth part 1 (or bandwidth part A). As shown by reference number 750, when cloned bandwidth part 2 is activated and bandwidth part B is activated, and the DCI message identifies primary bandwidth part 1 (or bandwidth part A), UE 120 activates bandwidth part A. Based at least in part on UE 120 determining that cloned bandwidth part 2 corresponds to primary bandwidth part 1, UE 120 does not need to change activation in the uplink direction, as UE 120 is already using primary bandwidth part 1 (via cloned bandwidth part 2 being activated already).

Although some aspects described herein are described in terms of one-to-plurality pairing of a single uplink bandwidth part to a plurality of downlink bandwidth parts, aspects described herein may also be used for plurality-to-one pairing for a single downlink bandwidth part paired to a plurality of uplink bandwidth parts. Additionally, or alternatively, although some aspects, described herein, are described in terms of signaling an identifier of an uplink bandwidth part (e.g., identifying bandwidth part 1 or bandwidth part 2 to indicate a change to bandwidth part A or bandwidth part B), some aspects described herein may use signaling of an identifier of a downlink bandwidth part (e.g., identifying bandwidth part A or bandwidth part B to identify a change to bandwidth part 1 or bandwidth part 2).

As shown in FIG. 7C, and by reference numbers 755 and 760, in the second scenario 725, BS 110 may transmit a DCI message identifying a bandwidth part and UE 120 may determine to perform a bandwidth part switch. For example, BS 110 may determine to activate primary bandwidth part 1 and bandwidth part B, and may transmit a DCI message identifying cloned bandwidth part 2. As shown by reference number 765, when a bandwidth part 3 in the uplink direction is activated and a bandwidth part C in the downlink direction is activated, and the DCI message identifies cloned bandwidth part 2, UE 120 activates bandwidth part B and follows the pointer from cloned bandwidth part 2 to primary bandwidth part 1 (e.g., the pointer indicates that an identifier of cloned bandwidth part 2 is to identify primary bandwidth part 1). In this case, UE 120 activates primary bandwidth part 1 with bandwidth part B. In this way, based at least in part on cloned bandwidth part 2 being a pointer to primary bandwidth part 1, UE 120 correctly activates the configured pairing of primary bandwidth part 1 and bandwidth part B.

As another example, BS 110 may determine to activate primary bandwidth part 1 and bandwidth part A, and may transmit a DCI message identifying primary bandwidth part 1. As shown by reference number 770, when bandwidth part 3 is activated and bandwidth part C is activated, and the DCI message identifies primary bandwidth part 1, UE 120 activates primary bandwidth part 1 and bandwidth part A. In this way, based at least in part on primary bandwidth part 1 being paired only to bandwidth part A with regard to signaling (e.g., rather than being one-to-plurality paired to both bandwidth part A and bandwidth part B), UE 120 correctly activates the pairing of primary bandwidth part 1 and bandwidth part A.

As another example, BS 110 may determine to activate primary bandwidth part 1 and bandwidth part B, and may transmit a DCI message identifying cloned bandwidth part 2. In this case, when bandwidth part 1 is activated and bandwidth part A is activated, and the DCI message identifies cloned bandwidth part 2, UE 120 activates bandwidth part B. Based at least in part on UE 120 determining that cloned bandwidth part 2 is a pointer to primary bandwidth part 1, UE 120 does not need to change activation in the uplink direction, as UE 120 is already using primary bandwidth part 1.

In this way, when signaled using a bandwidth part identifier message, a downlink bandwidth part from a configured set of bandwidth parts may be paired with an uplink bandwidth part of a configured set of bandwidth parts based at least in part on the downlink bandwidth part and the uplink bandwidth part having a common index value.

As indicated above, FIGS. 7A-7C are provided as examples. Other examples may differ from what is described with respect to FIGS. 7A-7C.

Figure 8:
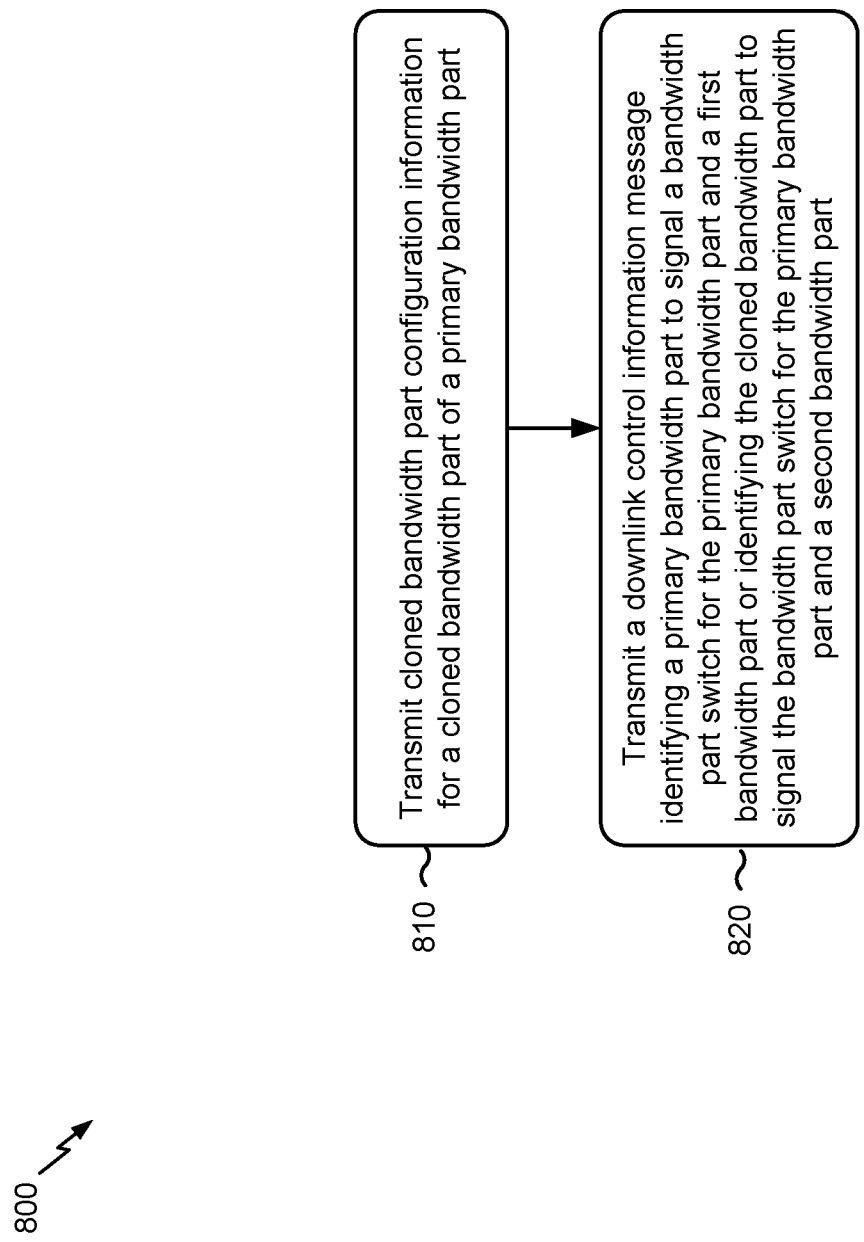
FIG. 8 is a diagram illustrating an example process performed, for example, by a base station, in accordance with various aspects of the present disclosure.

FIG. 8 is a diagram illustrating an example process 800 performed, for example, by a BS, in accordance with various aspects of the present disclosure. Example process 800 is an example where a BS (e.g., BS 110) performs bandwidth part switch management.

As shown in FIG. 8, in some aspects, process 800 may include transmitting cloned bandwidth part configuration information for a cloned bandwidth part of a primary bandwidth part (block 810). For example, the BS may transmit (e.g., using transmit processor 220, TX MIMO processor 230, modulator 232, antenna 234, and/or the like) the cloned bandwidth part configuration information for the cloned bandwidth part of the primary bandwidth part, as described in more detail above. In some aspects, the cloned bandwidth part is associated with a first direction and corresponds to a primary bandwidth part. In some aspects, the primary bandwidth part pairs to a first bandwidth part in a second direction and a second bandwidth part in the second direction.

As shown in FIG. 8, in some aspects, process 800 may include transmitting a downlink control information message identifying a primary bandwidth part to signal a bandwidth part switch for the primary bandwidth part and a first bandwidth part or identifying the cloned bandwidth part to signal the bandwidth part switch for the primary bandwidth part and a second bandwidth part (block 820). For example, the BS may transmit (e.g., using transmit processor 220, TX MIMO processor 230, modulator 232, antenna 234, and/or the like) the downlink control information message identifying the primary bandwidth part to signal the bandwidth part switch for the primary bandwidth part and the first bandwidth part or identifying the cloned bandwidth part to signal the bandwidth part switch for the primary bandwidth part and the second bandwidth part, as described in more detail above.

Process 800 may include additional aspects, such as any single aspect and/or any combination of aspects described below and/or in connection with one or more other processes described elsewhere herein.

In some aspects, the cloned bandwidth part is a cloned bandwidth part of the primary bandwidth part. In some aspects, the cloned bandwidth part configuration information corresponds to configuration information for the primary bandwidth part. In some aspects, the BS is configured to transmit the cloned bandwidth part configuration information using radio resource control signaling. In some aspects, the BS is configured to transmit the cloned bandwidth part configuration information to a UE to enable the UE to determine a linkage between the primary bandwidth part and the cloned bandwidth part.

In some aspects, the BS is configured to transmit the cloned bandwidth part configuration to cause the UE to store the linkage as a pointer between the primary bandwidth part and the cloned bandwidth part. In some aspects, the BS is configured to transmit the downlink control information message to cause the bandwidth part switch for the second direction and not for the first direction. In some aspects, the cloned bandwidth part is a pointer to the primary bandwidth part and the BS is configured to transmit the cloned bandwidth part configuration information to identify the pointer to the primary bandwidth part. In some aspects, the BS is configured to transmit the downlink control information message to identify the primary bandwidth part.

In some aspects, the BS is configured to transmit the downlink control information message to identify the cloned bandwidth part. In some aspects, the first direction is associated with uplink communication and the second direction is associated with downlink communication. In some aspects, the first direction is associated with downlink communication and the second direction is associated with uplink communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
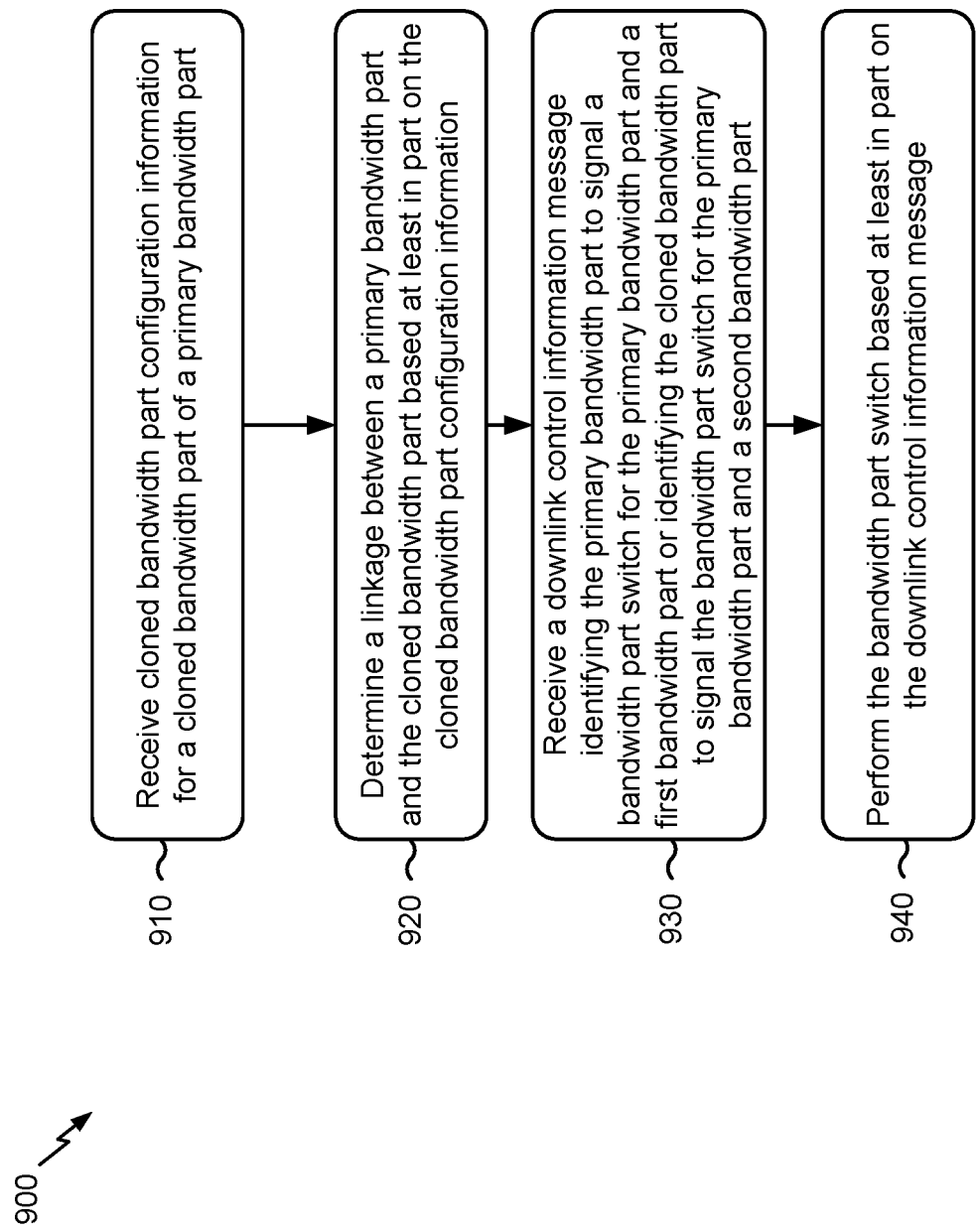
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs bandwidth part switch management.

As shown in FIG. 9, in some aspects, process 900 may include receiving cloned bandwidth part configuration information for a cloned bandwidth part of a primary bandwidth part (block 910). For example, the UE may receive (e.g., using antenna 252, demodulator 254, MIMO detector 256, receiver processor 258, and/or the like) the cloned bandwidth part configuration information for the cloned bandwidth part of a primary bandwidth apart, as described in more detail above. In some aspects, the cloned bandwidth part is associated with a first direction and corresponds to the primary bandwidth part. In some aspects, the primary bandwidth part pairs to a first bandwidth part in a second direction and a second bandwidth part in the second direction.

As shown in FIG. 9, in some aspects, process 900 may include determining a linkage between a primary bandwidth part and the cloned bandwidth part based at least in part on the cloned bandwidth part configuration information (block 920). For example, the UE may determine (e.g., using receiver processor 258, controller/processor 280, transmit processor 264, and/or the like) the linkage between the primary bandwidth part and the cloned bandwidth part based at least in part on the cloned bandwidth part configuration information, as described in more detail above.

As shown in FIG. 9, in some aspects, process 900 may include receiving a downlink control information message identifying the primary bandwidth part to signal a bandwidth part switch for the primary bandwidth part and a first bandwidth part or identifying the cloned bandwidth part to signal the bandwidth part switch for the primary bandwidth part and a second bandwidth part (block 930). For example, the UE may receive (e.g., using antenna 252, demodulator 254, MIMO detector 256, receiver processor 258, and/or the like) the downlink control information message identifying the primary bandwidth part to signal the bandwidth part switch for the primary bandwidth part and the first bandwidth part or identifying the cloned bandwidth part to signal the bandwidth part switch for the primary bandwidth part and the second bandwidth part, as described in more detail above.

As shown in FIG. 9, in some aspects, process 900 may include performing the bandwidth part switch based at least in part on the downlink control information message (block 940). For example, the UE may perform (e.g., using antenna 252, demodulator 254, MIMO detector 256, receiver processor 258, controller/processor 280, transmit processor 264, TX MIMO processor 266, modulator 254, and/or the like) the bandwidth part switch based at least in part on the downlink control information message, as described in more detail above.

Process 900 may include additional aspects, such as any single aspect and/or any combination of aspects described below and/or in connection with one or more other processes described elsewhere herein.

In some aspects, the cloned bandwidth part is a cloned bandwidth part of the primary bandwidth part. In some aspects, the cloned bandwidth part configuration information corresponds to configuration information for the primary bandwidth part. In some aspects, the UE is configured to receive the cloned bandwidth part configuration information using radio resource control signaling.

In some aspects, the UE is configured to store the linkage as a pointer between the primary bandwidth part and the cloned bandwidth part. In some aspects, the UE is configured to perform the bandwidth part switch for the second direction and not for the first direction. In some aspects, the cloned bandwidth part is a pointer to the primary bandwidth part and the UE is configured to identify the pointer to the primary bandwidth part based at least in part on the cloned bandwidth part configuration information. In some aspects, the downlink control information message identifies the primary bandwidth part and the UE is configured to perform the bandwidth part switch for the primary bandwidth part and the first bandwidth part.

In some aspects, the downlink control information message identifies the cloned bandwidth part and the UE is configured to perform the bandwidth part switch for the primary bandwidth part and the second bandwidth part. In some aspects, the first direction is associated with uplink communication and the second direction is associated with downlink communication. In some aspects, the first direction is associated with downlink communication and the second direction is associated with uplink communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
   transmitting cloned bandwidth part configuration information for a cloned bandwidth part of a primary bandwidth part,
      wherein the cloned bandwidth part is associated with a first direction and corresponds to the primary bandwidth part,
      wherein the primary bandwidth part pairs to a first bandwidth part in a second direction and a second bandwidth part in the second direction; and
   transmitting a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part.

2. The method of claim 1, wherein the cloned bandwidth part configuration information corresponds to configuration information for the primary bandwidth part.

3. The method of claim 1, wherein the BS is configured to transmit the cloned bandwidth part configuration information using radio resource control signaling.

4. The method of claim 1, wherein the BS is configured to transmit the cloned bandwidth part configuration information to a user equipment (UE) to enable the UE to determine a linkage between the primary bandwidth part and the cloned bandwidth part.

5. The method of claim 4, wherein the BS is configured to transmit the cloned bandwidth part configuration information to cause the UE to store the linkage as a pointer between the primary bandwidth part and the cloned bandwidth part.

6. The method of claim 1, wherein the BS is configured to transmit the downlink control information message to cause the bandwidth part switch for the second direction and not for the first direction.

7. The method of claim 1, wherein the BS is configured to transmit the downlink control information message to identify the primary bandwidth part.

8. The method of claim 1, wherein the BS is configured to transmit the downlink control information message to identify the cloned bandwidth part.

9. The method of claim 1, wherein the first direction is associated with uplink communication and the second direction is associated with downlink communication.

10. The method of claim 1, wherein the first direction is associated with downlink communication and the second direction is associated with uplink communication.

11. A method of wireless communication performed by a user equipment (UE), comprising:
   receiving cloned bandwidth part configuration information for a cloned bandwidth part of a primary bandwidth part,
      wherein the cloned bandwidth part is associated with a first direction and corresponds to the primary bandwidth part,
      wherein the primary bandwidth part pairs to a first bandwidth part in a second direction and a second bandwidth part in the second direction;
   determining a linkage between the primary bandwidth part and the cloned bandwidth part based at least in part on the cloned bandwidth part configuration information;
   receiving a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part; and
   performing the bandwidth part switch based at least in part on the downlink control information message.

12. The method of claim 11, wherein the cloned bandwidth part configuration information corresponds to configuration information for the primary bandwidth part.

13. The method of claim 11, wherein the UE receives the cloned bandwidth part configuration information using radio resource control signaling.

14. The method of claim 11, wherein the UE is configured to store the linkage as a pointer between the primary bandwidth part and the cloned bandwidth part.

15. The method of claim 11, wherein the UE is configured to perform the bandwidth part switch for the second direction and not for the first direction.

16. The method of claim 11, wherein the downlink control information message identifies the primary bandwidth part and the UE is configured to perform the bandwidth part switch for the primary bandwidth part and the first bandwidth part.

17. The method of claim 11, wherein the downlink control information message identifies the cloned bandwidth part and the UE is configured to perform the bandwidth part switch for the primary bandwidth part and the second bandwidth part.

18. The method of claim 11, wherein the first direction is associated with uplink communication and the second direction is associated with downlink communication.

19. The method of claim 11, wherein the first direction is associated with downlink communication and the second direction is associated with uplink communication.

20. A base station (BS) for wireless communication, comprising:
   a memory; and
   one or more processors operatively coupled to the memory, the memory and the one or more processors configured to:
      transmit cloned bandwidth part configuration information for a cloned bandwidth part of a primary bandwidth part,
         wherein the cloned bandwidth part is associated with a first direction and corresponds to the primary bandwidth part,
         wherein the primary bandwidth part pairs to a first bandwidth part in a second direction and a second bandwidth part in the second direction; and
      transmit a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part.

21. The BS of claim 20, wherein the cloned bandwidth part configuration information corresponds to configuration information for the primary bandwidth part.

22. The BS of claim 20, wherein the BS is configured to transmit the cloned bandwidth part configuration information using radio resource control signaling.

23. The BS of claim 20, wherein the BS is configured to transmit the cloned bandwidth part configuration information to a user equipment (UE) to enable the UE to determine a linkage between the primary bandwidth part and the cloned bandwidth part.

24. The BS of claim 23, wherein the BS is configured to transmit the cloned bandwidth part configuration information to cause the UE to store the linkage as a pointer between the primary bandwidth part and the cloned bandwidth part.

25. The BS of claim 20, wherein the BS is configured to transmit the downlink control information message to cause the bandwidth part switch for the second direction and not for the first direction.

26. The BS of claim 20, wherein the BS is configured to transmit the downlink control information message to identify the primary bandwidth part.

27. The BS of claim 20, wherein the BS is configured to transmit the downlink control information message to identify the cloned bandwidth part.

28. The BS of claim 20, wherein the first direction is associated with uplink communication and the second direction is associated with downlink communication.

29. The BS of claim 20, wherein the first direction is associated with downlink communication and the second direction is associated with uplink communication.

30. A user equipment (UE) for wireless communication, comprising:
a memory; and
one or more processors operatively coupled to the memory, the memory and the one or more processors configured to:
receive cloned bandwidth part configuration information for a cloned bandwidth part of a primary bandwidth part,
wherein the cloned bandwidth part is associated with a first direction and corresponds to the primary bandwidth part,
wherein the primary bandwidth part pairs to a first bandwidth part in a second direction and a second bandwidth part in the second direction;
determine a linkage between the primary bandwidth part and the cloned bandwidth part based at least in part on the cloned bandwidth part configuration information;
receive a downlink control information message identifying the primary bandwidth part to signal a bandwidth part switch for the primary bandwidth part and the first bandwidth part or identifying the cloned bandwidth part to signal the bandwidth part switch for the primary bandwidth part and the second bandwidth part; and
perform the bandwidth part switch based at least in part on the downlink control information message.

31. The UE of claim 30, wherein the cloned bandwidth part configuration information corresponds to configuration information for the primary bandwidth part.

32. The UE of claim 30, wherein the UE receives the cloned bandwidth part configuration information using radio resource control signaling.

33. The UE of claim 30, wherein the UE is configured to store the linkage as a pointer between the primary bandwidth part and the cloned bandwidth part.

34. The UE of claim 30, wherein the UE is configured to perform the bandwidth part switch for the second direction and not for the first direction.

35. The UE of claim 30, wherein the downlink control information message identifies the primary bandwidth part and the UE is configured to perform the bandwidth part switch for the primary bandwidth part and the first bandwidth part.

36. The UE of claim 30, wherein the downlink control information message identifies the cloned bandwidth part and the UE is configured to perform the bandwidth part switch for the primary bandwidth part and the second bandwidth part.

37. The UE of claim 30, wherein the first direction is associated with uplink communication and the second direction is associated with downlink communication.

38. The UE of claim 30, wherein the first direction is associated with downlink communication and the second direction is associated with uplink communication.

* * * * *